Figures 1, 2, 3:
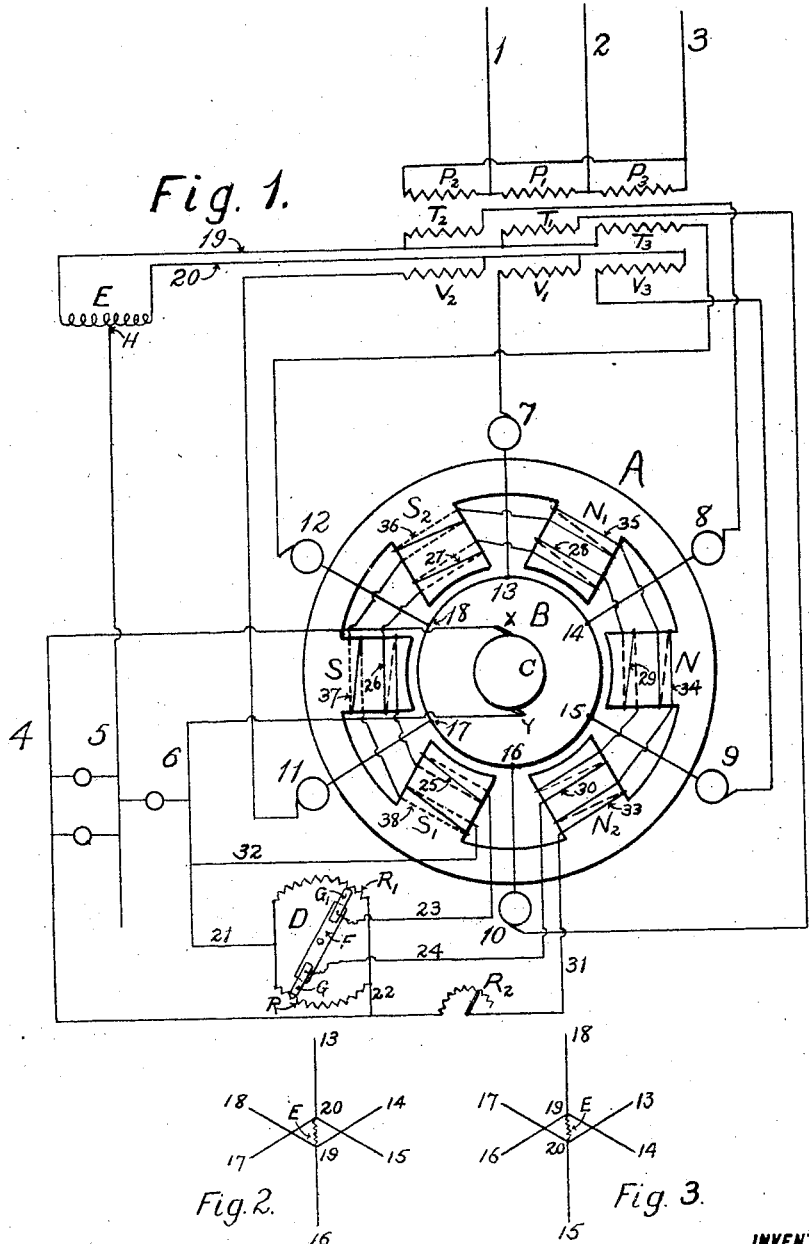

No. 854,862. PATENTED MAY 28, 1907.
J. L. WOODBRIDGE.
SYSTEM OF ELECTRICAL DISTRIBUTION.
APPLICATION FILED AUG. 29, 1906.

WITNESSES:

INVENTOR
Joseph Lester Woodbridge
BY
Augustine B. Stoughton
ATTORNEY.

UNITED STATES PATENT OFFICE.

JOSEPH LESTER WOODBRIDGE, OF PHILADELPHIA, PENNSYLVANIA.

SYSTEM OF ELECTRICAL DISTRIBUTION.

No. 854,862.  Specification of Letters Patent.  Patented May 28, 1907.

Application filed August 29, 1906. Serial No. 332,445.

*To all whom it may concern:*

Be it known that I, JOSEPH LESTER WOODBRIDGE, a citizen of the United States, and a resident of Philadelphia, in the county of Philadelphia, and State of Pennsylvania, have invented a certain new and useful System of Electrical Distribution, of which the following is a specification.

My invention relates to those systems of electrical distribution in which alternating currents are generated and are converted to direct current for distribution and applies particularly to those cases where the three wire system is employed for distribution and when a control of the direct current voltage is desired, independent of the alternating current voltage.

The object of my invention is to provide simple, more efficient and inexpensive means for transforming electrical energy from alternating to direct current and delivering said energy at controllable voltage to a three wire system of direct current distribution.

To this and other ends hereinafter set forth the invention comprises the improvements to be presently described and finally claimed.

The nature, characteristic features and scope of my invention will be more fully understood by reference to the following description, in connection with the accompanying drawings, in which Figure 1, illustrates the features of my invention, and Figs. 2 and 3, are vector diagrams, to which reference will be made in describing the mode of operation of the apparatus shown in Fig. 1.

Referring to Fig. 1, 1, 2, and 3, are the conductors of an alternating current, 3-phase supply circuit, across which are connected in delta the primary windings $P_1$, $P_2$ and $P_3$, of three static transformers. Each of these transformers is provided with two independent secondary windings; $T_1$ and $V_1$, being the secondaries corresponding to $P_1$; $T_2$ and $V_2$, corresponding to $P_2$; and $T_3$ and $V_3$ corresponding to $P_3$. The secondary windings are connected in star relation, $T_1$, $T_2$ and $T_3$, being each connected at one terminal to the common conductor 19, and $V_1$, $V_2$ and $V_3$, being similarly connected to the conductor 20. The outer terminals of the star formed by the secondaries $T_1$, $T_2$, and $T_3$, are connected by suitable brushes to the alternate collector rings 8, 10 and 12, of the rotary transformer A, while the outer terminals of the star formed by the secondaries $V_1$, $V_2$ and $V_3$ are similarly connected to the intermediate collector rings 7, 9 and 11.

The rotary transformer A, is constructed as a six-phase machine, the collector rings 7, 8, 9, 10, 11 and 12, being connected at equidistant points 13, 14, 15, 16, 17, and 18, of the armature in the usual manner. The magnetic field circuit of this rotary is, however, constructed in accordance with the description set forth in my Patent No. 679,813, the three adjacent pole pieces N, $N_1$, and $N_2$, being normally of one polarity, as for example, north, while the other three pole pieces S, $S_1$ and $S_2$, are of the opposite polarity, the rotary as here shown being therefore a bipolar machine, each pole being divided into three sections. The commutator C, of this rotary is connected by means of the direct current brushes X, and Y, to the outside wires 4, and 6, respectively of the three-wire direct current consumption circuit 4, 5, and 6. The conductors 19 and 20, which constitute the common junctions of the two secondary stars, are connected to the terminals of a reactive coil E, to whose middle point H, is connected the neutral wire 5, of the three-wire circuit.

The rotary is provided with two field windings. The principal winding 33, 34, 35, 36, 37, and 38 is connected by means of the conductors 31 and 32, across the outside wires 4, and 6, of the three-wire circuit. The effect of this winding is to produce north polarity in the three pole sections N, $N^1$ and $N^2$, and south polarity in the other three sections S, $S^1$ and $S^2$, and it is controlled in the usual manner by the rheostat $R^2$, inserted in the conductor 31. The second or auxiliary field winding 25, 26, 27, 28, 29 and 30, is wound in the opposite direction on alternate pole sections, and when current is sent through it in the proper direction, it will increase the field strength in the outside pole sections $N_1$, $N_2$, $S_1$ and $S_2$, and will diminish the field strength in the middle pole sections N and S. If current is sent through this winding in the opposite direction the effect will be reversed. The amount and direction of the current in the auxiliary field winding, 25, 26, 27, 28, 29, and 30, is controlled by the double pole rheostat D. This rheostat consists of two resistances R, and $R^1$, connected in parallel across the outside wires 4, and 6, of the three wire system, by means of the conductors 21 and 22. An insulating arm F, pivoted at its center, carries at each end, respectively, a conducting contact piece G, and G, which make contact with the resistances R and R₁, at various points, according to the position of the arm F. The contact pieces G and G₁, are connected respectively by the conductors 23, and 24, to the terminals of the auxiliary field winding, 25, 26, 27, 28, 29 and 30. The rheostat D, is a well known piece of apparatus and its operation need not be further described.

The effect of the auxiliary winding 25, 26, 27, 28, 29 and 30, as set forth in my Patent No. 679,813, hereinabove referred to, is to alter the direct current voltage of the rotary, without changing the alternating current counter-electro-motive force developed in its armature, between the points 14, 16, and 18, of one delta, or between the points 13, 15 and 17, of the other delta. These two deltas being connected as shown, to independent secondaries on the static transformers, it is possible, with a constant alternating current voltage on the supply circuit 1, 2, and 3, to vary the direct current voltage delivered to the outside wires 4, 6, of the three wire circuit.

The function of reactance coil E, will be more clearly understood by reference to the vector diagrams in Figs. 2 and 3. If current is flowing in the auxiliary winding 25, 26, 27, 28, 29, and 30, in such direction as to increase the field strength of the outer pole sections and decrease that of the middle sections, the effect of this winding will be to increase the total field flux between the points 13 and 16, of the rotary armature, and therefore to increase the potential between these points when the armature is in the position shown in Fig. 1. At the same time the field flux between the points 14 and 15 and the points 17 and 18 of the rotary armature will be decreased, and consequently the potential difference between these points will be decreased. This condition is illustrated by the diagram in Fig. 2, and the result is to produce a difference of potential between the junction points 19 and 20 of the two secondary stars. When the rotary armature has revolved through an angle of 60 degrees, the conditions existing will be illustrated by diagram in Fig. 3. The point 18 has now advanced to the position formerly occupied by 13, and a similar advance has been made in the position of the other points on the armature. It will be seen from this diagram that the difference of potential between points 19 and 20 has exactly reversed. It follows from this that the terminals of the reactance coil E, will be subjected to an alternating current potential of three times the frequency of that of the supply circuit 1, 2, 3. The middle point of this resistance coil will, however, always be of a potential half way between that of the points 13 and 16, when the armature is in a position shown in Fig. 1, and half way between any other opposite points in the armature when they are brought into this position. Since the direct current brushes always make contact with those armature conductors which are in the position occupied by the points 13 and 16 in Fig. 1, the middle point H, of the reactance coil E, will always have a potential half way between that of the two direct current brushes, and will therefore serve as a neutral connection for the middle conductor 5, of the three wire system.

Having thus described the nature and objects of my invention, what I claim as new and desire to secure by Letters Patent is

1. In combination a polyphase alternating current supply circuit; static transformers having their primary windings connected to said circuit and their secondary windings connected as two independent three phase stars differing in phase by 180 electrical degrees, a six phase rotary converter, the alternating current terminals of whose armature are connected to the corresponding terminals of the secondary windings of the static transformers; means for varying the distribution of the magnetic flux over the pole faces of the rotary converter; a three wire direct current consumption circuit, the outside conductors of which are connected to the respective brushes of the rotary; a reactance connected between the centers of the two secondary stars; and a connection from the neutral conductor of the three wire consumption circuit to an intermediate point in the reactance.

2. In combination a polyphase alternating current supply circuit; static transformers having their primary windings connected to said circuit and their secondary windings connected as two independent three phase stars differing in phase by 180 electrical degrees; a six phase rotary converter, the alternating current terminals of whose armature are connected to the corresponding terminals of the secondary windings of the static transformers and whose magnetic poles are divided each into three parallel paths; means for varying the distribution of magnetic flux in the three paths; a three wire direct current consumption circuit, the outside conductors of which are connected to the respective brushes of the rotary; a reactance connected between the centers of the two secondary stars; and a connection from the neutral conductor of the three wire consumption circuit to an intermediate point in the reactance.

In testimony whereof I have hereunto signed my name.

JOSEPH LESTER WOODBRIDGE.

Witnesses:
W. J. JACKSON,
FRANK E. FRENCH.